United States Patent [19]

Kishi et al.

[11] Patent Number: 4,722,547
[45] Date of Patent: Feb. 2, 1988

[54] ULTRA-SONIC SENSOR SYSTEM FOR MONITORING ROLLING AND/OR PITCHING MOTION OF VEHICLE

[75] Inventors: Teruo Kishi; Yosuke Yamamoto, both of Tokyo, Japan

[73] Assignee: Nissan Motor Company, Limited, Yokohama, Japan

[21] Appl. No.: 823,119

[22] Filed: Jan. 27, 1986

[30] Foreign Application Priority Data

Jan. 28, 1985 [JP] Japan .................................. 60-12357

[51] Int. Cl.⁴ ............................................. B60G 17/08
[52] U.S. Cl. ............................ 280/707; 280/DIG. 1; 364/424
[58] Field of Search ................ 180/169; 280/689, 707, 280/6 R, 6 H, DIG. 1; 364/424; 342/123

[56] References Cited

U.S. PATENT DOCUMENTS

| | | | |
|---|---|---|---|
| 3,003,783 | 10/1961 | Brueder | 280/707 |
| 4,528,563 | 7/1985 | Takeuchi | 180/169 |
| 4,600,215 | 7/1986 | Kuroki et al. | 180/169 |

FOREIGN PATENT DOCUMENTS

| | | | |
|---|---|---|---|
| 3424979 | 1/1986 | Fed. Rep. of Germany | 280/707 |
| 174007 | 10/1983 | Japan | 280/6 R |

Primary Examiner—John J. Love
Assistant Examiner—Ross Weaver
Attorney, Agent, or Firm—Schwartz, Jeffery, Schwaab, Mack, Blumenthal & Evans

[57] ABSTRACT

An ultra-sonic senor system suitable for monitoring movement of a vehicle, relative to the horizontal employs two or more coordinated ultra-sonic sensors. The sensors may be mounted at opposite ends or on opposite sides of the vehicle, depending on whether pitch or roll respectively is to be monitored. Each sensor broadcasts ultra-sonic waves and receives ultra-sonic waves reflected by the road surface. The transmission time is known; the reception time is measured upon detection of the peak of the reflected waves. The difference between the two above times yields the distance between the vehicle and the road. The difference between the distances measured by two sensor yields the inclination of the vehicle relative to the horizontal plane.

15 Claims, 9 Drawing Figures

ULTRA-SONIC SENSOR SYSTEM FOR MONITORING ROLLING AND/OR PITCHING MOTION OF VEHICLE

BACKGROUND OF THE INVENTION

The present invention relates generally to an ultra-sonic sensor to be employed in an automotive suspension control system. More specifically, the invention relates to an ultra-sonic sensor system suitable for detecting rolling and/or pitching motion of the vehicle and controlling the automotive suspension in accordance with the intensity of rolling and/or pitching.

In the recent years, various automotive suspension control systems attempting to improve riding comfort without affecting driving stability have been proposed and developed. Some of such suspension control systems control damping characteristics of the suspension system depending upon the magnitude of rolling and/or pitching motion of the vehicle.

Conventionally, such rolling and/or pitching motion of the vehicle have been monitored indirectly using various vehicular driving parameters other than the vehicle body behaviour per se. For instance, in order to detect rolling motion of the vehicle, lateral force, steering angular displacement and so forth are observed. On the other hand, in order to detect vehicular pitching motion, application of the brakes, acceleration and deceleration of the vehicle and so forth are observed.

On the other hand, the co-pending U.S. patent application Ser. No. 647,648, filed on Sept. 6, 1984 now abandoned and assigned to the assignee of the present invention discloses an electronic suspension control system employing an ultra-sonic sensor for monitoring road surface conditions for use in road roughness dependent suspension control. In the disclosed system, ultra-sonic waves are transmitted toward the road surface and the ultra-sonic waves reflected by the road surface are received. In theory, the ultra-sonic sensor system measures the elapsed time between an ultra-sonic waves transmission and reflected ultra-sonic waves reception. Based on the measured elapsed time and the known propagation speed of the ultra-sonic waves, the distance can be arithmetically derived. In practice, the measurement of the elapsed time starts in response to the onset of transmission of the ultra-sonic waves. In order to avoid the influence of noise, an ultra-sonic waves receiver signal, the signal value of which is dependent upon the received intensity of ultra-sonic waves, is compared with a predetermined threshold value. When the receiver signal level exceeds the threshold level, the measurement of the elapsed time is terminated and the measured elapsed time value is latched. However, the received intensity of ultra-sonic wave tends to fluctuate depending upon the external condition, such as atmospheric temperature and so forth. This makes the result of measurement of the elapsed time inaccurate.

SUMMARY OF THE INVENTION

In view of the above-mentioned defects in the prior art, it is an object to provide an ultra-sonic sensor system which can satisfactorily and successfully avoid the influences of the noise and/or influences of the external condition.

It is another object of the present invention to provide an ultra-sonic sensor system which can monitor vehicular rolling and/or pitching motion by monitoring the distance between the vehicle body and the road surface.

In order to accomplish the aforementioned and other objects, an ultra-sonic sensor system, according to the present invention, comprises at least two ultra-sonic sensors arranged in lateral or longitudinal alignment on the vehicle body. Each ultra-sonic sensor has a transmitter for transmitting ultra-sonic waves toward the road surface and a receiver for receiving ultra-sonic waves reflected by the road surface. The transmitters of both or all ultra-sonic sensors are controlled so that the ultra-sonic waves are transmitted by all of the transmitters at substantially the same time. The receivers output receiver signals having values depending upon the intensity of the received, reflected ultra-sonic waves. Elapsed times between transmission of the ultra-sonic waves and the peaks of the receiver signals for each of the ultra-sonic sensors are compared to each other to derive the difference therebetween. The difference between the elapsed times measured by neighboring ultra-sonic sensors is used as a measure of roll or pitch intensity for use in controlling the automotive suspension.

DESCRIPTION OF THE PREFERRED EMBODIMENT

Figure 1:
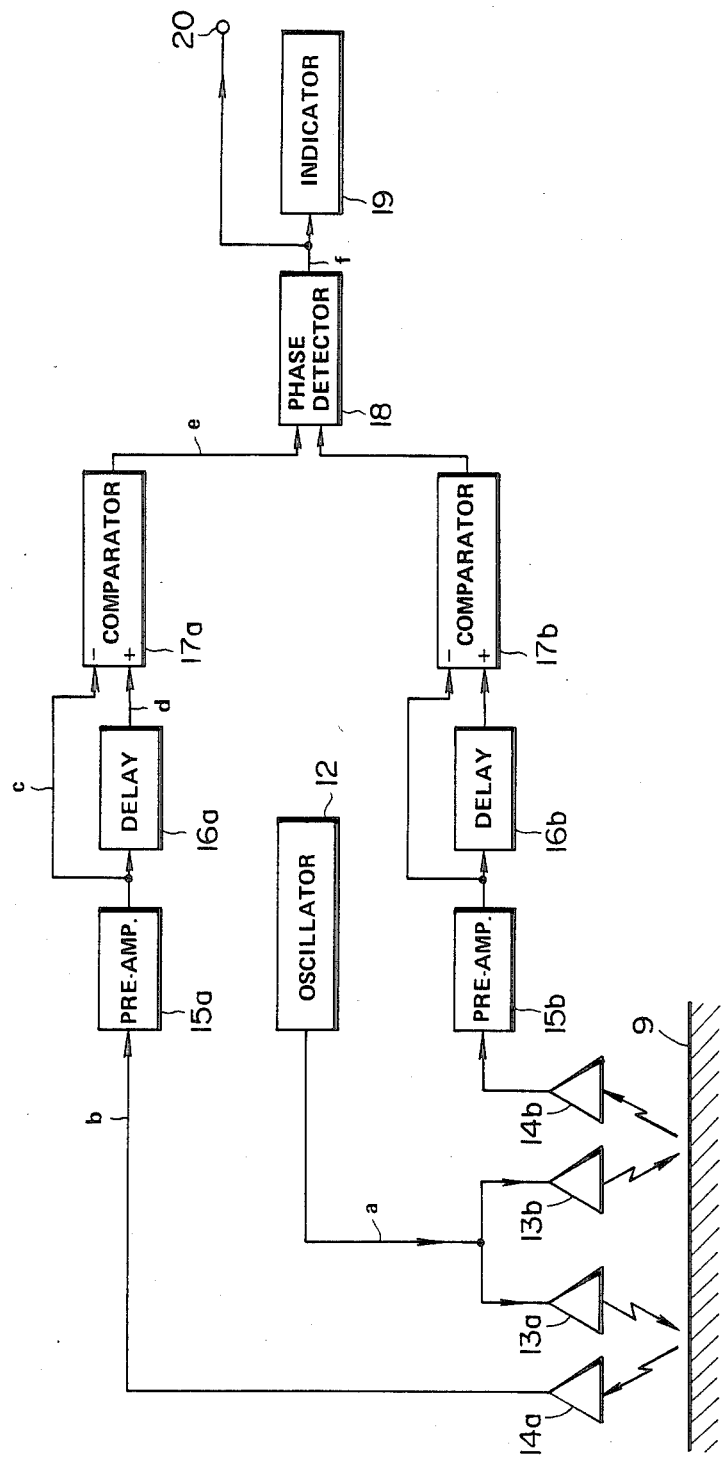
FIG. 1 is a block diagram of the preferred embodiment of an ultra-sonic sensor system according to the present invention.

Referring now to the drawings, particularly to FIG. 1, the preferred embodiment of an ultra-sonic sensor system, according to the present invention, will be described in terms of vehicular rolling detection and lateral profile monitor. However, it should be appreciated that the ultra-sonic sensor system of the invention can also be used to monitor vehicular pitching motion and/or longitudinal profile.

As shown in FIG. 1, the preferred embodiment of the ultra-sonic sensor system employs a pair of ultra-sonic sensors. The ultra-sonic sensors are arranged on opposite sides of the vehicle body in lateral alignment. The ultra-sonic sensors have ultra-sonic waves transmitter elements 13a and 13b and ultra-sonic waves receiver elements 14a and 14b. The transmitter elements 13a and 13b are connected to a common oscillator 12 which is activated at controlled timings to output an oscillation signal a to both of the transmitter elements 13a and 13b. The transmitter elements 13a and 13b are responsive to the oscillation signal a from the oscillator 12 to transmit ultra-sonic waves toward the road surface 9.

It should be noted that, in the preferred embodiment, the oscillator 12 produces oscillation signals a in the ultra-sonic frequency range, e.g., equal to or higher than 20 kHz.

The receiver element 14a receives reflected ultra-sonic waves originally transmitted by the transmitter element 13a and reflected by the road surface 9. The receiver element 14a produces a receiver signal b having a value depending upon the received intensity of the reflected ultra-sonic waves. The receiver signal b from the receiver element 14a is sent to a pre-amplifier 15a. The pre-amplifier 15a amplifies the receiver signal level to a predetermined extent. The pre-amplifier 15a includes a low-pass filter for filtering high-frequency components out of the receiver signal and so picks up only the envelope of the receiver signal b. Thus, the pre-amplifier 15a outputs an envelope signal c. The envelope signal c is sent to an inverted input terminal of a comparator 17a and to a delay circuit 16a. The delay circuit 16a sends a delayed envelope signal d to a non-inverting input terminal of the comparator 17a after a given delay time. The delay $\tau$ imposed by the delay circuit must be relatively short so that a positive comparator signal e seals approximately at the peak of the envelope signal c.

The comparator 17a is connected for output of a comparator signal e to a phase difference detector circuit 18.

Similarly, the receiver element 14b is connected to a pre-amplifier 15b. The pre-amplifier 15b has substantially the same function as the pre-amplifier 15a, i.e. it produces a envelope signal representative of the low-frequency envelope of the receiver signal from the receiver element 14b. The envelope signal from the pre-amplifier 15b is sent to the inverting input terminal and to the non-inverting input terminal of a comparator 17b. The input at the non-inverting terminal of the comparator 17b is delayed by a delay circuit 16b. The comparator 17b outputs a comparator signal to the phase difference detector circuit 18.

The phase difference detector circuit 18 derives the phase difference between the comparator signals from the comparators 17a and 17b. Since the derived phase difference of the comparator signal represents the difference between the elapsed times between transmission of the ultra-sonic waves and reception of the reflected ultra-sonic waves of the two ultra-sonic sensors, and thus is representative of the difference between the distances between the vehicle body and the road surface at the two sensor positions, the vehicular lateral profile can be detected by monitoring the phase difference. The phase difference detector circuit 18 produces a phase difference indicative signal F. The phase difference indicative signal f is sent to an indicator 19 which displays the lateral profile of the vehicle. The indicator 19, employed in the shown embodiment, may be a roll gauge graphically displaying the lateral inclination of the vehicle.

Also, the phase difference indicative signal f from the phase difference detector circuit 19 is transmitted to an automotive suspension control system which automatically controls the damping characteristics of the vehicular suspension system. The suspension control system 20 is responsive to the phase difference indicative signal f from the phase difference detector circuit 18 of the ultra-sonic sensor system to perform roll-suppressive suspension control.

Figure 2:
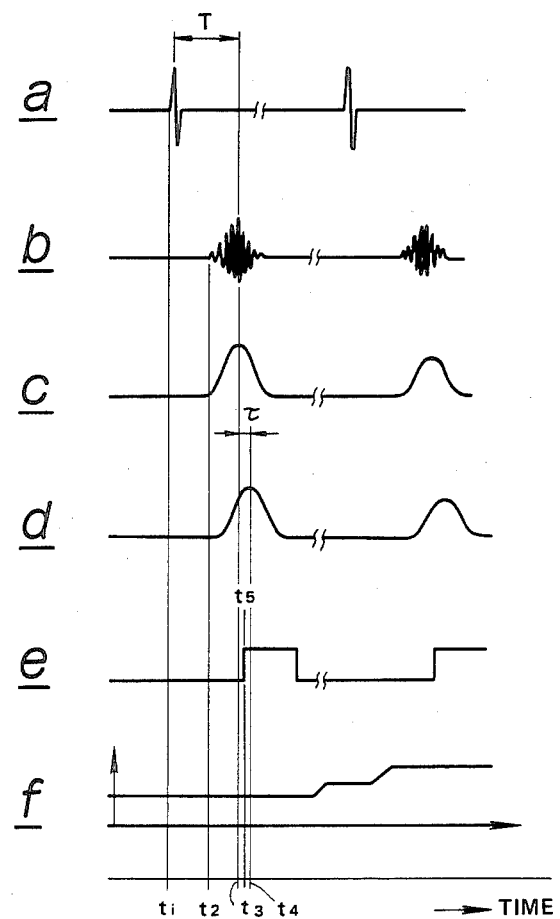
FIG. 2 is a timing chart of operation of an ultra-sonic sensor according to the preferred embodiment of the ultra-sonic sensor system of FIG. 1.
Figure 3:
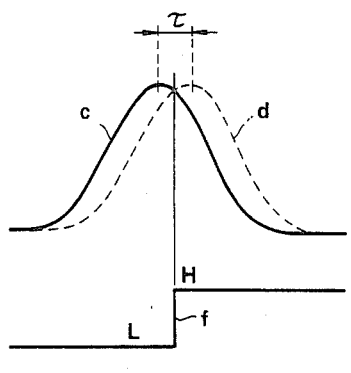
FIG. 3 is a graph of a typical input and output of a comparator employed in each of the sensor circuits of the ultra-sonic sensors.

FIG. 2 is a timing chart of operation of the above-mentioned ultra-sonic sensor system according to the present invention. In FIG. 2, the oscillator 12 is activated at a timing $t_1$ to output the oscillation signal a to the transmitter elements 13a and 13b. From a timing $t_2$, the receiver element 14a starts to receive the reflected ultra-sonic waves. The received intensity varies as illustrated increasing toward a peak and then decreasing monotonically. Therefore, the receiver signal b varies according to variation of the received intensity. This causes the envelope signal c of the pre-amplifier 15a to vary as illustrated. After the given delay $\tau$, the delayed envelope signal d is input to the comparator 17a. As shown in FIGS. 2 and 3, assuming the envelope signal reaches its peak value at time $t_3$ and the delayed envelope signal d reaches the peak at time $t_4$, the comparator signal e goes HIGH at time $t_5$ which is inbetween time $t_3$ and $t_4$.

Although FIG. 2 only shows the operation of the sensor circuit connected to the receiver element 13a, the sensor circuit for the receiver element 13b has substantially the same function. Therefore, shortly after the peak of the envelope signal produced by the pre-amplifier 15b, the comparator signal of the comparator 17b goes HIGH.

The phase difference detector circuit 18 receives the comparator signals from the comparators 17a and 17b and detects the timing offset between the leading edges of the HIGH-level comparator signals. The phase difference signal value corresponds to this timing difference and represents the lateral inclination of the vehicle body.

Figure 4:
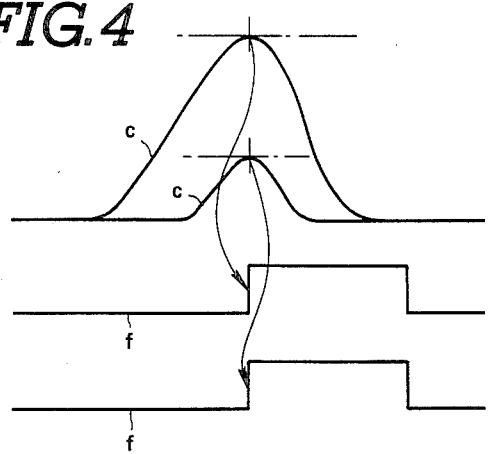
FIG. 4 is a graph of comparator output timing at various receiver signal levels.

As shown in FIG. 4, the receiver signal amplitude may fluctuate due to external conditions, such as weather, temperature, road surface conditions, vehicle driving speed and so forth. Therefore, if the reception timing of the reflected ultra-sonic waves is detected when the receiver signal level exceeds a predetermined threshold for use in deriving the elapsed time between transmission of the ultra-sonic waves and reception of the reflected ultra-sonic waves in order to derive the distance from the vehicle body to the road surface, the resultant distance indicative value will tend to fluctuate with external conditions. Therefore, when distance values derived in the manner set forth above are compared to monitor the lateral inclination of the vehicle, erroneous readings will result due to the errors in the distance-indicative values. In the preferred embodiment, since the timing of the peak of the receiver signal is not influenced by external conditions, the peak of the received ultra-sonic waves can be detected with satisfactory precision.

Figure 5:
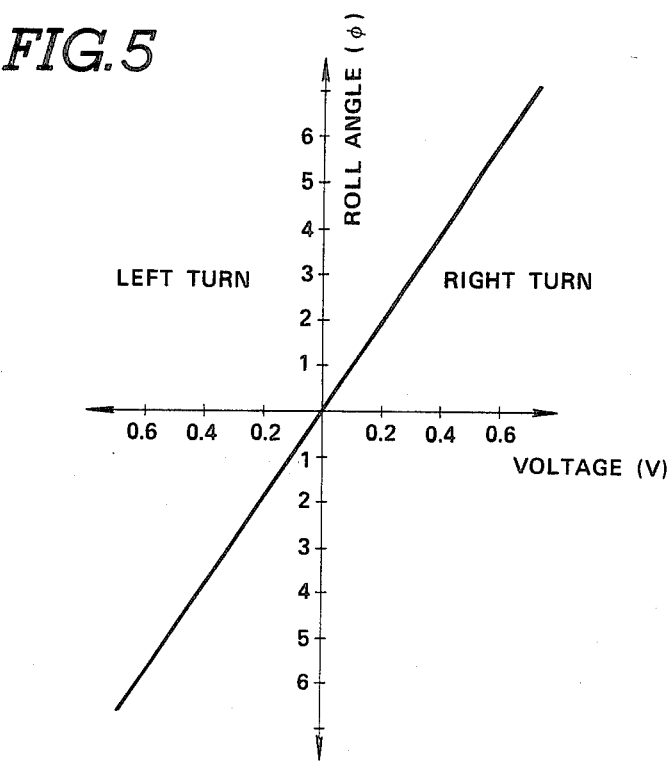
FIG. 5 is a graph of the relationship between the roll angle of the vehicle body and the output of a phase difference detector in the ultra-sonic sensor system of FIG. 1.
Figure 6:
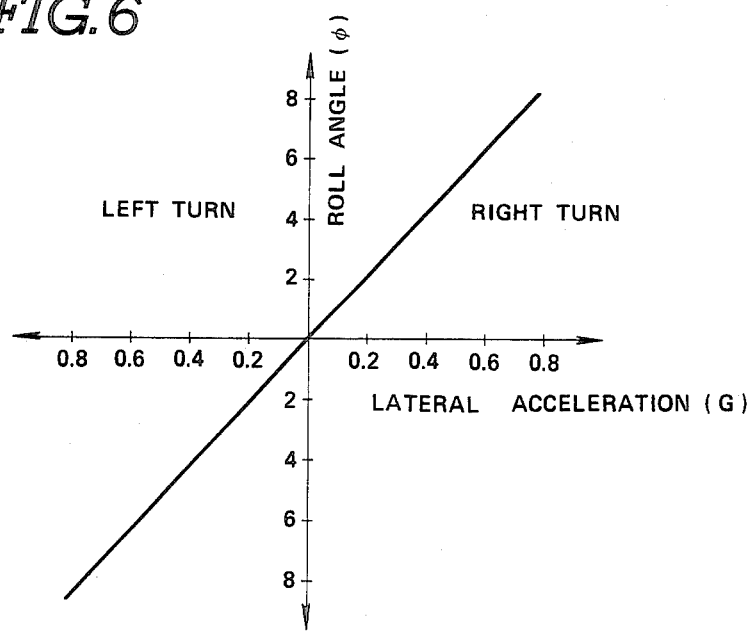
FIG. 6 is a graph of the relationship between the roll angle of the vehicle body and the lateral acceleration exerted on the vehicle body.

As shown in FIG. 5, the preferred embodiment of the phase difference detector circuit 18 outputs the phase difference indicative signal f in the form of an analog voltage signal related linearly to the detected phase difference. The voltage of the phase difference indicative signal f thus varies linearly with the roll angle $\phi$ of the vehicle body. On the other hand, the vehicle body roll angle φ is related to the vehicular lateral acceleration as illustrated in FIG. 6. Therefore, the lateral acceleration exerted on the vehicle can be derived on the basis of the phase difference indicative signal from the phase difference detector circuit 19.

Figure 7:
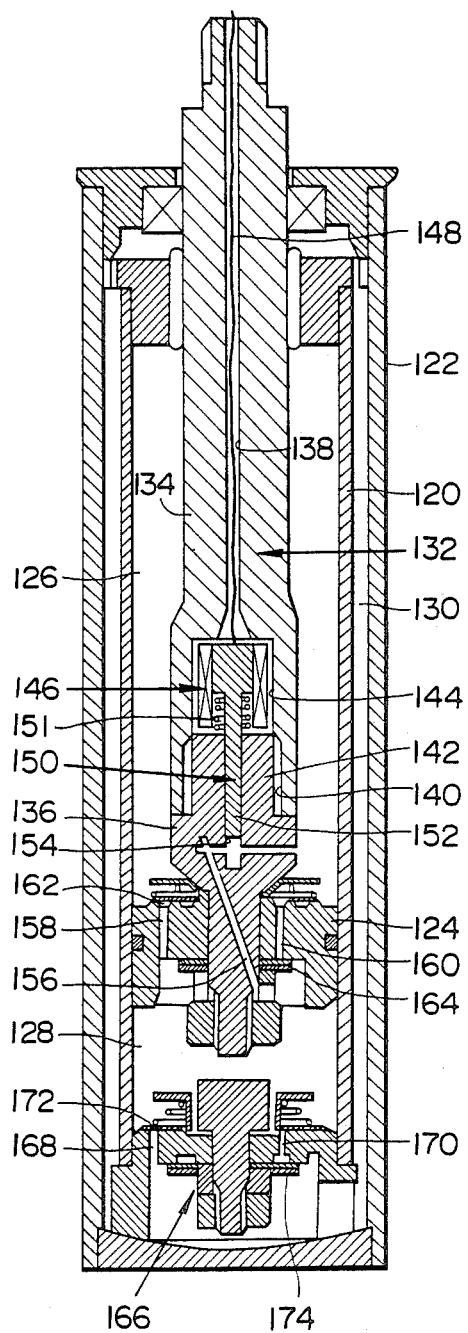
FIG. 7 is a longitudinal section through a shock absorber suited for roll suspension using roll information provided by the sensor system of FIG. 1.

The automotive suspension control system may perform rolling suppressive suspension control based on the phase difference indicative signal which serves as roll-intensity signal. FIG. 7 shows an example of the automotive shock absorber implementing rolling magnitude dependent suspension control.

In order to allow adjustment of the shock absorbing characteristics, the shock absorber 114 generally comprises an inner and an outer hollow cylinders 120 and 122 arranged coaxially, and a piston 124 fitting flush within the hollow space in the inner cylinder 120, as shown in FIG. 7. The piston 124 defines upper and lower fluid chambers 126 and 128 within the inner cylinder 120. The inner and outer cylinders define an annular fluid reservoir chamber 130.

The piston 124 is connected to the vehicle body (not shown) by means of a piston rod which is generally referred to by the reference number 132. The piston rod 132 is formed with an axially extending through opening 138.

The piston 124 defines flow-restrictive fluid passages 158 and 160. The upper end of the fluid passage 158 is closed by a resilient flow-restricting valve 162. Similarly, the lower end of the fluid passage 160 is closed by a flow-restricting valve 164. The flow-restricting valves 162 and 164 serve as check valves for establishing one-way fluid communication in opposite directions. In addition, since the flow-restriction valves 162 and 164 are biased toward the ends of the fluid passages 158 and 160, they open to allow fluid communication between the upper and lower fluid chambers 126 and 128 only when the fluid pressure difference between the upper and lower chambers 126 and 128 overcomes the effective pressure of the valves.

The piston 124 has a central through opening 124a. Upper end of the opening 124a engages the lower end of the piston rod 132. The lower end of the opening 124a receives the upper end of a sleeve 152. The sleeve 152 has an axially extending bore 152a, which receives a flow control valve spool 155, and a plurality of radially extending orifices 154. The sleeve 152 is further formed with an annular groove 160b extending around its inner periphery. The radially extending orifices 154 open into the annular groove 160b. The outer ends of the orifices 154 opens toward the lower fluid chamber 128.

The valve spool 155 is formed with annular groove 160a on the outer periphery thereof. The annular groove 160a is in communication with the upper fluid chamber 126 through a fluid passage 136 defined through the piston body and the sleeve. The annular groove 160a is located at a vertical position at which it opposes the annular groove 160b of the sleeve 152 at the lower position of the spool and does not overlap the annular groove 160b at all at the upper position of the spool.

The spool 155 is normally biased upwards by means of a bias spring 146d of an actuator 146 which comprises an electromagnetic coil 146a housed in an enclosed casing 146b and a yoke 146c. The casing 146b engages the sleeve 152 at its upper end so that the actuator 146 can be firmly mounted on the piston 124. When the electromagnetic coil 146a is energized, it pulls the spool 155 downwardly to move the spool to its lower position.

When the spool is in the lower position, fluid can flow between the upper and lower fluid chambers 126 and 128 through the fluid passage 156, the grooves 160a and 160b and orifices 154. Therefore, the total flow area for fluid communication between the upper and lower chambers 126 and 128 is increased. As a result, there is less resistance to flow, which softens the damping characteristics of the vehicle. On the other hand, when the spool is in the upper position, fluid communication between the upper and lower fluid chambers 126 and 128 through the fluid passage 156 is blocked. Therefore, at this position, fluid communication between the upper and lower fluid chambers 126 and 128 is possible only by way of the fluid passages 156 and 158. Thus, the fluid flow area is decreased so as to exert higher resistance to fluid flow. Therefore, the damping force of the shock absorber 114 is increased.

As will be appreciated herefrom, when the controller orders SOFT mode when the phase difference indicative signal have is smaller than a predetermined value, the actuator 146 is energized to lower the spool to establish fluid communication between the upper and lower fluid chambers 126 and 128 through the fluid passage 156. On the other hand, when the controller orders HARD mode in response to the phase difference indicative signal is equal to or greater than the predetermined value, the actuator 146 is deenergized to move the spool 155 to its upper position by means of the bias spring 146d. Thus, fluid communication between the upper and lower fluid chambers 126 and 128 via the fluid passage 156 is blocked.

It should be appreciated that the following description of the automotive suspension control system is merely an example of application of the phase difference signal derived by the preferred embodiment of the ultra-sonic sensor system. Therefore, it should be understood that the phase difference signal is applicable to various suspension control systems and other systems which require roll information and/or the lateral acceleration exerted on the vehicle as parameters.

Figure 8:
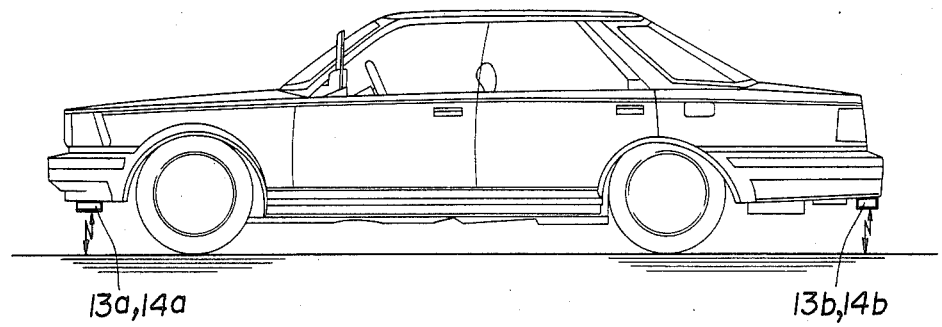
FIG. 8 is a side elevation of the vehicle having the preferred embodiment of the ultra-sonic sensor system with a pair of ultra-sonic sensors in longitudinal alignment.
Figure 9:
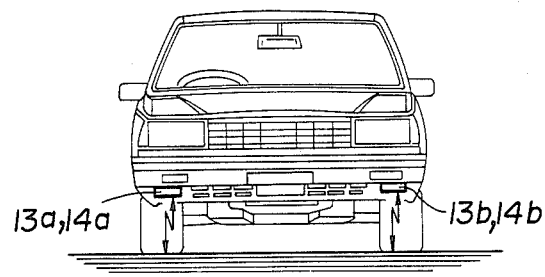
FIG. 9 is a front elevation of the vehicle having the preferred embodiment of the ultra-sonic sensor system with a pair of ultra-sonic sensors in lateral alignment.

FIGS. 8 and 9 show examples of arrangement of the ultra-sonic sensors for detecting pitching and rolling of the vehicle. For instance, when the ultra-sonic sensors are arranged in longitudinal alignment as shown in FIG. 8, the phase difference represents the difference of the vehicular height at the front and rear ends of the vehicle and thus represents vehicular pitching. On the other hand, when the ultra-sonic sensors are arranged in a lateral alignment, the phase difference represents a difference of the vehicular height at both lateral sides of the vehicle and thus represents magnitude of vehicular rolling.

Although the peak value of the envelope signal has been disclosed as being detected by comparing the envelope signal value with a delayed envelope signal value in the shown embodiment, it would be possible to arithmetically derive the timing of the peak of the envelope signal by differentiating the envelope signal and detecting zero-crossing of the differentiated value. Also, the peak detection of the envelope signal can be implemented in various ways. Therefore, the specific manner disclosed in the discussion of the preferred embodiment of the invention should not be taken as a feature specifying the invention.

Furthermore, the present invention can be embodied in various ways other than the shown embodiment.

Therefore, the invention should not be interpreted as being limited to the features disclosed in the preferred embodiment.

What is claimed is:

1. An ultra-sonic sensor system comprising:
   a transmitter transmitting ultra-sonic waves toward an object;
   a receiver receiving ultra-sonic waves reflected by the object and producing a receiver signal having a value depending upon the intensity of the received reflected ultra-sonic waves;
   means for detecting the timing at which said receiver signal reaches a specific relationship with a peak of said receiver signal and thereby specifying a reception timing of the reflected ultra-sonic waves; and
   means for deriving a distance value based on the elapsed time between transmission of the ultra-sonic waves toward said object and said reception timing.

2. The ultra-sonic sensor system as set forth in claim 1, wherein said timing detecting means comprises a delay circuit receiving said receiver signal and outputting the receiver signal after a predetermined delay and a comparator receiving said receiver signal directly from said receiver and from said delay circuit and producing a comparator signal which changes state approximately at the peak of the receiver signal.

3. The ultra-sonic sensor system as set forth in claim 2, wherein said delay imposed by the delay circuit is relatively short so as to ensure that the comparator signal changes state as closely as possible to the timing at which the receiver signal reaches its peak.

4. An ultra-sonic sensor system adapted for monitoring a vehicular body profile, comprising:
   a first ultra-sonic sensor including a first transmitter and a first receiver which is adapted to receive ultra-sonic waves reflected by a road surface and to produce a receiver signal having a value depending upon the intensity of the received ultra-sonic waves;
   a second ultra-sonic sensor including a second transmitter for transmitting ultra-sonic waves at substantially the same time as said first transmitter, and a receiver which is adapted to receive ultra-sonic waves reflected by the road surface and producing a receiver signal having a value depending upon the intensity of the received, reflected ultra-sonic waves;
   a first sensor circuit associated with said first ultra-sonic sensor and adapted to derive a first timing at which the receiver signal of said first receiver substantially reaches a peak;
   a second sensor circuit associated with said second ultra-sonic sensor and adapted to derive a second timing at which the receiver signal level of said second receiver substantially reaches a peak; and
   means for deriving a timing difference between said first and second timings and deriving vehicular body profile data based on said derived timing difference, and producing an output signal indicative of the vehicle body profile data.

5. The ultra-sonic sensor system as set forth in claim 4, wherein said first and second transmitters are connected to a common oscillator so as to be driven simultaneously by a common oscillation signal from said oscillator.

6. The ultra-sonic sensor system as set forth in claim 4, wherein said first and second ultra-sonic sensors are arranged in lateral alignment and on opposite lateral edges of the vehicle body.

7. The ultra-sonic sensor system as set forth in claim 4, wherein said first and second ultra-sonic sensors are arranged in longitudinal alignment and on opposite longitudinal ends of the vehicle body.

8. The ultra-sonic sensor system as set forth in claim 4, wherein said first and second sensor circuits further comprise means for amplifying said receiver signals to a predetermined level, isolating envelope components from the receiver signals and outputting corresponding envelope signals.

9. The ultra-sonic sensor system as set forth in claim 8, wherein said first and second timings are derived with respect to said envelope signals.

10. The ultra-sonic sensor systems as set forth in claim 9, wherein each of said first and second sensor circuits further comprises a delay circuit and a comparator, said delay circuit receiving said envelope signal from said amplifying means and outputting said envelope signal after a given delay, and said comparator receiving said envelope signal directly from said amplifying means and from said delay circuit, comparing the received envelope signals and deriving a corresponding one of said first and second timings.

11. The ultra-sonic sensor system as set forth in claim 10, wherein said comparators in said first and second sensor circuits are adapted to change output level at said first and second timings.

12. A method for monitoring vehicle body profile comprising the steps of:
   providing first and second ultra-sonic sensors at different positions on the vehicle body;
   actuating said first and second ultra-sonic sensors to transmit ultra-sonic waves toward a road surface;
   receiving ultra-sonic waves reflected by said road surface and producing receiver signals related to the intensity of the received ultra-sonic waves reflected by the road surface;
   detecting a first timing at which said receiver signal of said first ultra-sonic sensor substantially reaches a peak;
   detecting a second timing at which said receiver signal of said second ultra-sonic sensor substantially reaches a peak; and
   comparing said first and second timing and deriving a vehicle body profile signal based thereon.

13. The method as set forth in claim 12, wherein said vehicle body profile signal has a value corresponding to the time difference between said first and second timings.

14. An ultra-sonic sensor system comprising:
   a transmitter transmitting ultra-sonic waves toward an object;
   a receiver receiving ultra-sonic waves reflected by the object and producing a receiver signal having a value depending upon the intensity of the received reflected ultra-sonic waves;
   means for detecting the timing at which said receiver signal reaches a specific relationship with a peak of said receiver signal, said timing detecting means comprising a delay circuit receiving said receiver signal and outputting the receiver signal after a predetermined delay and a comparator receiving said receiver signal directly from said receiver and from said delay circuit and producing a comparator signal which changes state approximately at the peak of the receiver signal and thereby specifying a reception timing of the reflected ultra-sonic waves; and means for deriving a distance value based on the elapsed time between transmission of the ultra-sonic waves toward said object and said reception timing.

15. An ultra-sonic sensor system comprising;

a transmitter transmitting ultra-sonic waves toward an object;

a receiver receiving ultra-sonic waves reflected by said object and producing a receiver signal having a peak value;

means for detecting a reception time of said receiver signal, said reception time being indicative of the detection of said peak value;

means for deriving a distance value based on the elapsed time between transmission of said ultra-sonic waves toward said object and said reception time.

* * * * *